United States Patent [19]

Mukae

[11] 4,013,412
[45] Mar. 22, 1977

[54] METHOD FOR JUDGING PURITY OF PURIFIED ZINC SULPHATE SOLUTION USED FOR ELECTROLYTIC PRODUCTION OF ZINC

[75] Inventor: Satoshi Mukae, Shimonoseki, Japan

[73] Assignee: Mitsui Mining & Smelting Co., Ltd., Tokyo, Japan

[22] Filed: July 22, 1975

[21] Appl. No.: 598,031

[30] Foreign Application Priority Data

Aug. 1, 1974 Japan .............................. 49-88274

[52] U.S. Cl. ...................... 23/230 PC; 23/253 PC; 73/19; 204/1 T; 204/195 R
[51] Int. Cl.$^2$ .................. G01N 31/12; C25B 1/04; C25C 1/16; G01N 7/06
[58] Field of Search ................ 23/230 PC, 253 PC; 204/195 R, 1 T; 73/19, 23 R

[56] References Cited

UNITED STATES PATENTS

| | | | |
|---|---|---|---|
| 3,224,837 | 12/1965 | Moyat | 23/230 PC |
| 3,681,026 | 8/1972 | Holden | 73/19 X |
| 3,853,474 | 12/1974 | Austin | 23/230 PC X |
| 3,945,797 | 3/1976 | Mlinko et al. | 23/230 PC |

OTHER PUBLICATIONS

Grützner, "Oscillopolarographic Determination of Cadmium in Zinc," Anal. Abst. No. 4582, vol. 15, Aug. 1968.
Blutstem et al., "Alternating Current Linear Sweep and Stipping Voltammetry with Phase-Selective Second Harmonic Detection," Anal Chem., vol. 46, 1531–1538, Sept. 1974.

*Primary Examiner*—Norman Yudkoff
*Assistant Examiner*—Barry I. Hollander

[57] ABSTRACT

A method and apparatus for judging the purity of a purified zinc sulphate solution used for the electrolytic production of zinc, which are based on the finding that the purity of the purified electrolyte has a fixed relationship with the ratio between the amount of hydrogen gas and the amount of oxygen gas generated by electrolysis of the purified electrolyte. According to the method and apparatus, a mixture of hydrogen gas and oxygen gas generated by the electrolysis of the purified zinc sulphate solution is charged in a combustion chamber of predetermined volume and ignited by a heater to ignite the hydrogen gas, and the difference between the internal pressures of the combustion chamber before and after the combustion of the hydrogen gas is detected for measuring the hydrogen gas content in the gas mixture.

1 Claim, 3 Drawing Figures

METHOD FOR JUDGING PURITY OF PURIFIED ZINC SULPHATE SOLUTION USED FOR ELECTROLYTIC PRODUCTION OF ZINC

BACKGROUND OF THE INVENTION

This invention relates to a method and apparatus for judging the purity of a purified zinc sulphate solution used for the electrolytic production of zinc, and more particularly to a method and apparatus of the kind above described in which the content of hydrogen gas in a gas mixture obtained by the electrolysis of the purified zinc sulphate solution is measured for judging the purity of the purified electrolyte.

It is commonly known that electrowinning of zinc from an acidic aqueous zinc sulphate solution thereof can be easily done utilizing such properties of zinc that zinc is a base metal and the hydrogen overvoltage of zinc is very high in the electrolysis. Zinc is thus generally produced by a electrolytic process in which such an electrolyte is subjected to electrolysis for the purpose of electrowinning of zinc. Therefore, the electrolyte supplied to the electrolysis section of the electrolytic zinc plant must be sufficiently purified to such an extent that it is substantially free from undesirable metal ions or ions of impurity metals which are separated from the electrolyte together with the zinc cathode in the electrolytic section of the electrolysis and tend to reduce the hydrogen overvoltage at the cathodes. This is because, when a purified zinc sulphate solution containing such impurity metal ions in large amounts is supplied to the electrolysis section, various troubles including undesirable reductions in the current efficiency and quality of products are given decrease to and a great length of time is required to recover normal state sources of electrolysis by removing of these troubles.

An effective means for judging the purity of the purified electrolyte supplied to the electrolysis section of the electrolytic zinc plant is essentially necessary due to the fact that the current efficiency in the electrolysis section is greatly adversely affected by the presence of undesirable impurity metal ions as pointed out above. A purity judging means has been proposed thitherto in which individual impurities are analyzed for judging the impurity of the purified zinc sulphate solution. However, this prior art means has been defective in that the operation of analysis is quite troublesome and time-consuming, and the purity judged merely on the basis of the individual analyzed values is not always accurate and reliable due to the fact that the adverse effect of the impurities on the purity is variable depending on the interaction of these impurities.

Another purity judging means has been proposed which comprises suitably adjusting the acidity of the purified zinc electrolyte, disposing an anode and a cathode in a vessel having the electrolyte, supplying current across the electrodes, and directly measuring the hydrogen overvoltage at the cathode. However, this latter prior art means has also been defective in that a complex and expensive apparatus is required for the measurement and the result of the measurement is not always fully reliable. Thus, this latter means has not yet been widely employed in this field.

The present inventors have made a series of experiments and studies in an effort to obtain a highly effective and reliable means for judging the purity of the purified zinc sulphate solution. As a result of such effort, the present inventors have discovered that the content of hydrogen gas in a gas mixture produced by the electrolysis of the purified zinc sulphate solution (electrolyte) under predetermined electrolytic conditions has a fixed relationship with the current efficiency during the electrolysis of the purified acid aqueous solution as the electrolyte, and the lower the hydrogen gas content, the purity is higher and the current efficiency is improved.

SUMMARY OF THE INVENTION

It is an object of the present invention to provide a novel and improved method and apparatus for judging the purity of a purified zinc sulphate solution used for the hydrometallurgical production of zinc.

Another object of the present invention is to provide a method and apparatus of the kind above described in which the content of hydrogen gas in a gas mixture generated by the electrolysis of the purified zinc sulphate solution is measured to judge the purity of the purified zinc sulphate solution.

Still another object of the present invention is to provide a method and apparatus of the kind above described in which the gas mixture obtained by the electrolysis of the purified zinc sulphate solution as electrolytic solution is ignited in a vessel of predetermined volume and the difference between the internal pressures of the vessel before and after the combustion is measured to measure the hydrogen gas content in the gas mixture thereby judging the purity of the purified zinc sulphate solution.

A further object of the present invention is to provide a method and apparatus of the kind above described in which means are provided so that the purity of the purified zinc sulphate solution can be automatically measured.

In accordance with one aspect of the present invention, there is provided a method of judging the purity of a purified zinc sulphate solution used for the electrolytic plant of zinc comprising the steps of sampling a part of said purified zinc sulphate solution from purification section and subjecting the same to electrolysis to generate a mixture of hydrogen gas and oxygen gas, feeding said gas mixture into a combustion chamber, igniting said hydrogen gas in said gas mixture by an ignition heater disposed within said combustion chamber in a state in which said combustion chamber is fully closed, and measuring the internal pressure of said combustion chamber before and after the combustion of said hydrogen gas thereby measuring the content of said hydrogen gas in said gas mixture so as to judge the purity of said zinc sulphate solution on the basis of the hydrogen gas content thus measured.

In accordance with another aspect of the present invention, there is provided an apparatus for judging the purity of a purified zinc sulphate solution used for the electrolytic plant of zinc comprising means for sampling a part of said purified zinc sulphate solution, an electrolytic cell for electrolysis of a part of said purified zinc sulphate solution to generate a mixture of hydrogen gas and oxygen gas therein, a cover member covering said electrolytic cell to define between it and said electrolytic cell a closed space for containing said gas mixture generated by the electrolysis, a combustion chamber connected to said closed space by a conduit having a fluid flow on-off valve therein, means for drawing from said closed space and feeding into said combustion chamber said gas mixture generated by the electrolysis and occupying said closed space so that said gas mixture can be subjected to combustion in said combustion chamber in a state in which said combustion chamber is fully closed, an ignition heater disposed in said combustion chamber for igniting said hydrogen gas in said gas mixture, and a pressure gauge connected to said combustion chamber for measuring the internal pressure of said combustion chamber before and after the combustion of said hydrogen gas thereby measuring the content of said hydrogen gas in said gas mixture so as to determine the purity of said electrolyte on the basis of the hydrogen gas content thus measured.

DETAILED DESCRIPTION OF THE PREFERRED EMBODIMENTS

Figure 1:
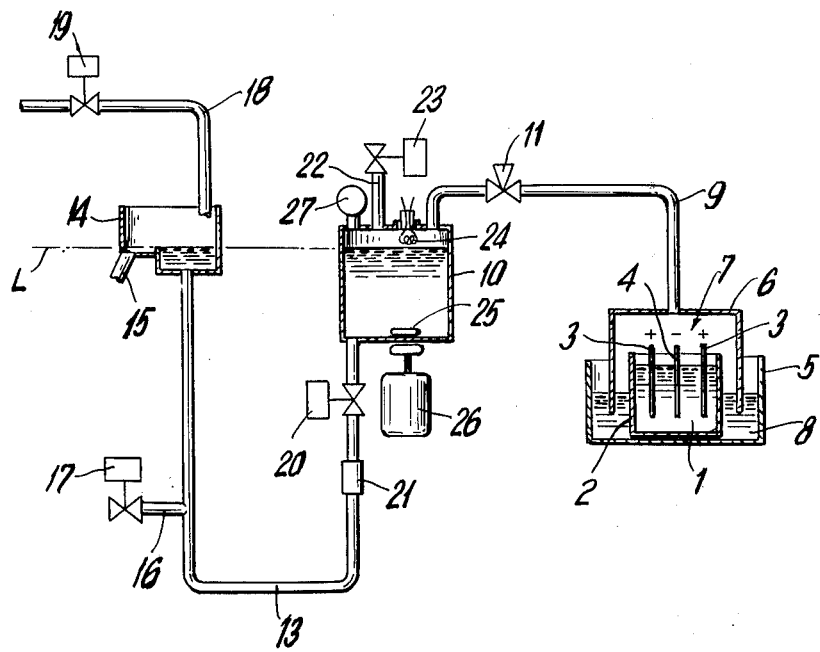
FIG. 1 is a diagrammatic view showing schematically the structure of an embodiment of the apparatus according to the present invention adapted for judging the purity of a purified zinc sulphate solution used for the electrolytic zinc plant.

Referring to FIG. 1, a part of a purified zinc sulphate solution is extracted from the path of flow of the purified zinc sulphate solution toward industrial electrolytic cells (not shown), and the acidity thereof is adjusted to be constant by adding thereto suitable amounts of sulfuric acid and water or zinc sulfate solutions containing free sulfuric acid. Such a sample (purified zinc sulphate solution) electrolyte 1 is shown contained in a small-sized electrolytic cell 2 used for the measurement of the purity of the purified zinc sulphate solution 1.

An anode 3 in the form of a plate (10 mm thickness) of silver-containing lead and a cathode 4 in the form of a plate (4 mm thickness) of aluminum are immersed in the electrolyte 1 contained in the small-sized electrolytic cell 2 so as to electrolyze the sample (purified zinc sulphate solution) electrolyte 1. This small-sized electrolytic cell 2 is disposed within a vessel 5 and is covered by a cover member 6 which defines a closed space 7 between it and the electrolytic cell 2. Water 8 is placed in the vessel 5 so that the temperature of the electrolyte 1 in the electrolytic cell 2 can be maintained substantially constant and gases generated by the electrolysis can be sealed against the atmospheric air.

Figure 3:
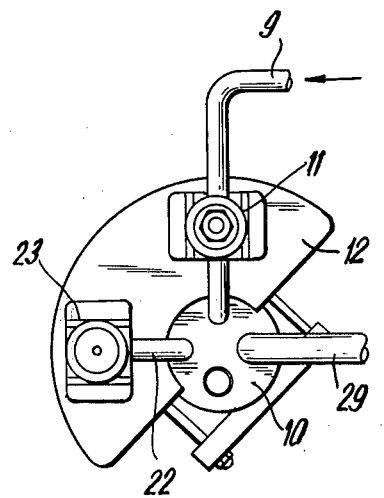
FIG. 3 is a plane view of part of FIG. 2 when viewed along the line III — III in FIG. 2.
Figure 2:
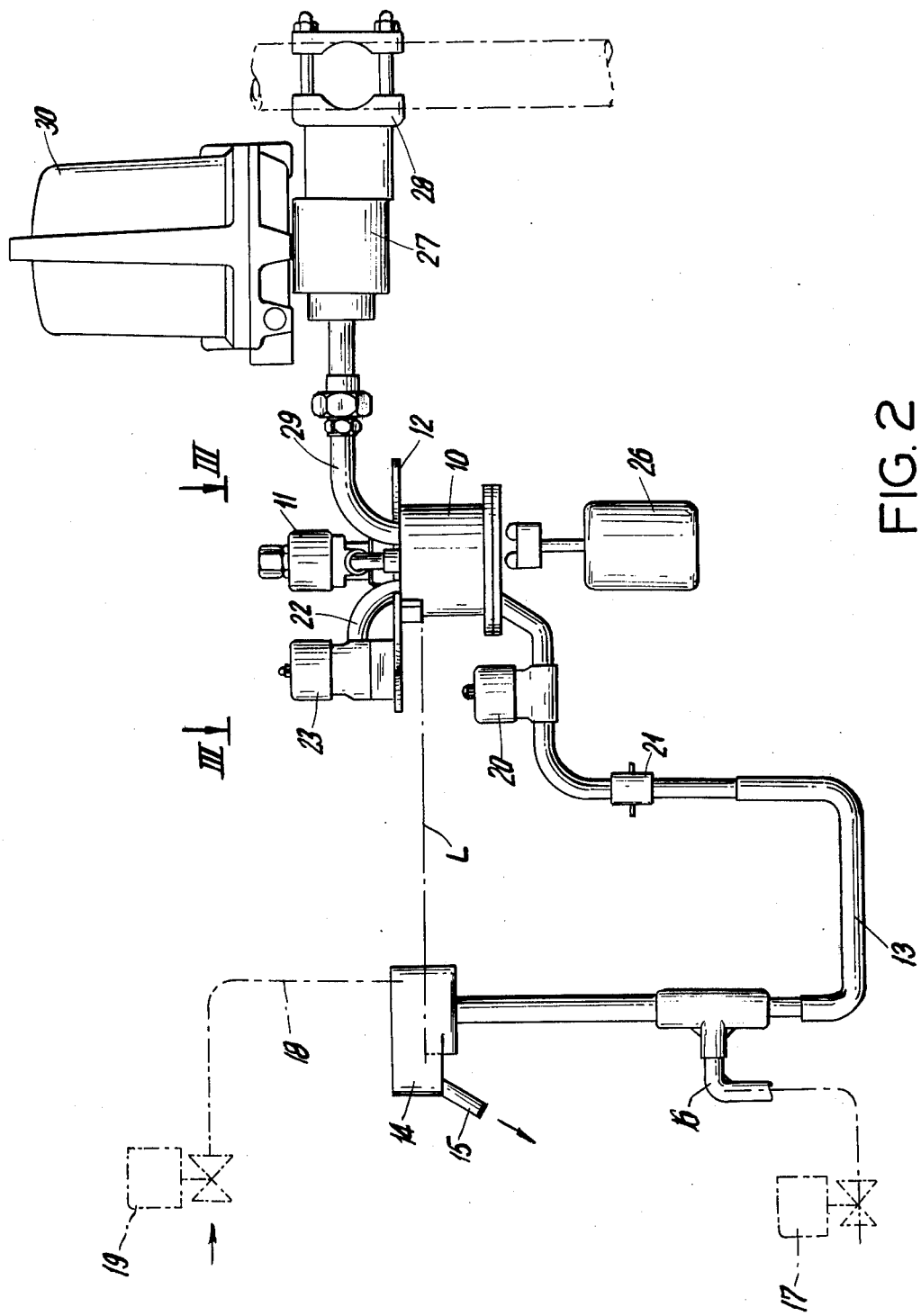
FIG. 2 is an enlarged front elevational view of part of the apparatus shown in FIG. 1.

A conduit 9 extends from the top wall of the cover member 6 to connect the closed space 7 above the electrolytic cell 2 to a combustion chamber 10 so that a gas mixture of hydrogen gas and oxygen gas generated by the electrolysis of the electrolyte 1 in the electrolytic cell 2 can be fed by the conduit 9 into the combustion chamber 10. A solenoid-operated three-way change-over valve 11 is disposed in the conduit 9. This valve 11 is supported on a supporting plate 12 mounted to the body of the combustion chamber 10 as seen in FIGS. 2 and 3. This solenoid-operated three-way change-over valve 11 has three operating positions. In the first position, it permits flow of the gas mixture generated in the electrolytic cell 2 toward the combustion chamber 10, and in the second position, it shuts off the gas mixture flow toward the combustion chamber 10, while in the third position, it acts to discharge the gas mixture to the atmosphere.

A U-shaped connecting conduit 13 is connected at one end thereof with an overflow tank 14 having an overflow port 15 and at the other end thereof to the bottom wall of the combustion chamber 10. A drain pipe 16 having a solenoid-operated valve 17 is connected to the U-shaped connecting conduit 13, and a liquid supply conduit 18 having a solenoid-operated valve 19 terminates above the overflow tank 14 to supply a liquid into the overflow tank 14, thence through the connecting conduit 13 into the combustion chamber 10 up to a liquid level which is determined by the overflow level L in the overflow tank 14. Thus, the gas mixture generated by the electrolysis in the electrolytic cell 2 and occupying the closed space 7 beneath the cover member 6 is drawn into the combustion chamber 10 when the liquid filled in the combustion chamber 10 is discharged and the liquid level in the combustion chamber 10 is lowered to the bottom level.

A solenoid-operated valve 20 is disposed in the U-shaped connecting conduit 13 adjacent to the end connected to the combustion chamber 10 and cooperates with the solenoid-operated valve 17 on the drain pipe 16 so as to control the charge and discharge of the liquid into and out of the combustion chamber 10. The solenoid-operated valve 17 is disposed at a level lower than that of the solenoid-operated valve 20. A level detector 21 is disposed in the U-shaped connecting conduit 13 at a level slightly above the solenoid-operated valve 17 but beneath the position of the solenoid-operated valve 20 so as to detect whether or not the liquid in the combustion chamber 10 is completely discharged. The solenoid-operated valve 19 disposed in the liquid supply conduit 18 is controlled by a timer to control the liquid supply into the overflow tank 14 from the conduit 18. Any excess of the liquid supplied into the overflow tank 14 after attainment of the overflow level L in the tank 14 is discharged from the overflow port 15, and thus, the constant liquid level is maintained in the overflow tank 14. A gas vent pipe 22 having a solenoid-operated valve 23 extends from the top wall of the combustion chamber 10 for venting the gases from the combustion chamber 10 to the atmosphere. This solenoid-operated valve 23 is also mounted on the supporting plate 12 as seen in FIGS. 2 and 3. The solenoid-operated valve 23 is urged to the open position when it is desired to vent the gases from the combustion chamber 10 to the atmosphere. At this time, the solenoid-operated valve 20 is also in the open position, while the solenoid-operated valve 17 is in the closed position.

The solenoid-operated valve 23 is closed while maintaining the solenoid-operated valve 20 in the open position after the timer-controlled solenoid-operated valve 19 is urged to the closed position to cease the supply of the liquid into the overflow tank 14 from the liquid supply conduit 18. The solenoid-operated valve 17 is then opened to discharge the liquid from the combustion chamber 10 to the exterior of the apparatus through the solenoid-operated valve 20 and the associated portion of the U-shaped connecting conduit 13. After the gas mixture in the closed space 7 is drawn into the combustion chamber 10 due to the discharge of the liquid from the combustion chamber 10, the solenoid-operated three-way change-over valve 11 is changed over to the position in which it shuts off the gas flow through the conduit 9, and the solenoid-operated valve 20 is urged to the closed position to place the combustion chamber 10 in a fully closed state.

An ignition means or heater 24 is mounted to the inner surface of the top wall of the combustion chamber 10 to ignite the gas mixture confined within the combustion chamber 10. A stirrer 25 in the form of a bar magnet is disposed in the combustion chamber 10 adjacent to the bottom wall thereof for stirring the gas mixture under combustion, shortening the length of time required for combustion of the gas mixture and ensuring complete combustion of the hydrogen gas. A motor 26 is disposed beneath the bottom wall of the combustion chamber 10, and a magnet is mounted on the upper end of the motor shaft opposite to the magnet bar stirrer 25 in the combustion chamber 10 to cause rotation of the stirrer 25. A pressure detector 27 is supported by a supporting member 28 and is connected to the combustion chamber 10 by a conduit 29 extending through the top wall of the combustion chamber 10 into the combustion chamber 10 to detect the internal pressure of the combustion chamber 10. The difference between the internal pressures of the combustion chamber 10 before and after the combustion of the hydrogen gas is measured by the pressure detector 27 to measure the content of the hydrogen gas in the gas mixture, and the purity of the purified zinc sulphate solution is then calculated on the basis of the detected hydrogen gas content. A differential pressure transmitter 30 is provided to the body of pressure detector 27 as seen in FIG. 2 for transmitting the detected differential pressure to a recorder (not shown).

In operation, the electrolytic cell 2 is set to operate with predetermined electrolytic conditions. For example, the current density is set at 600 A/m$^2$, the distance between the both anodes 3 and the cathode 4 is set at 34 mm, the composition of the electrolyte 1 is set at 70 g/l of zinc and 90 g/l of sulfuric acid, and the temperature of the electrolyte 1 is set at 95° F (35° C). Current is then supplied across the electrodes in the electrolytic cell 2 to initiate the electrolysis thereby generating hydrogen gas and oxygen gas at the cathode 4 and anodes 3 respectively. Air or gases previously present in the space 7 are purged through the solenoid-operated three-way change-over valve 11 until the entire space 7 is occupied by the gas mixture produced by the electrolysis. This is attained when the electrolysis is continuously carried out for several minutes.

After the above step, the solenoid-operated valves 20 and 23 are opened, and while maintaining the solenoid-operated valve 17 in the closed position, the solenoid-operated valve 19 is opened to supply the liquid into the overflow tank 14 from the liquid supply conduit 18. The liquid supplied into the overflow tank 14 flows through the U-shaped connecting conduit 13 into the combustion chamber 10 to be filled therein up to the level determined by the overflow level L in the overflow tank 14. Thus, unnecessary gases previously present in the combustion chamber 10 are vented to the atmosphere through the vent pipe 22 and the valve 23. Purge of unnecessary gases from the combustion chamber 10 can also be attained by changing over the solenoid-operated three-way change-over valve 11 to the position in which it establishes communication between the combustion chamber 10 and the space 7 and supplying the gas mixture generated by the electrolysis into the combustion chamber 10. In such a case, therefore, the electrolysis may be initiated after the liquid is fed into the combustion chamber 10. In this case, the unnecessary gases and air previously present in the combustion chamber 10 are purged by the vent pipe 22 and/or the gas mixture supplied through the valve 11.

Subsequently, the supply of the liquid into the overflow tank 14 from the liquid supply conduit 18 is ceased, and the valve 17 is urged to the open position while closing the valve 23 so as to discharge the liquid from the combustion chamber 10 through the conduit 13 and drain pipe 16. As a result of the discharge of the liquid from the combustion chamber 10 by the gravity, the mixture of hydrogen gas and oxygen gas produced by the continuing electrolysis is drawn into the combustion chamber 10 to fill the space previously occupied by the liquid.

The level detector 21 detects complete discharge of the liquid from the combustion chamber 10, and the valve 20 is then closed. The internal pressure of the combustion chamber 10 is now negative due to the complete discharge of the liquid from the combustion chamber 10. The amount of the gas mixture introduced into the combustion chamber 10 is preferably as large as possible in order to improve the accuracy of measurement. Therefore, the solenoid-operated three-way change-over valve 11 is kept in the position in which it permits communication between the space 7 and the combustion chamber 10, and the gas mixture generated progressively by the continuing electrolysis is introduced into the combustion chamber 10 consequently, the internal pressure of the combustion chamber 10 approaches gradually to zero (relative pressure) to establish finally a positive pressure in the combustion chamber 10. However, an excessively high positive internal pressure is undesirable in that it results in the loss of the effect of seal by the water 8 for the gas mixture produced by the electrolysis of the electrolyte in the electrolytic cess 2. It is therefore desirable to close the valve 20 thereby placing the combustion chamber 10 in the fully closed state after the level detector 21 detects complete discharge of the liquid from the combustion chamber 10 and the pressure detector 27 detects indication of the pressure value of zero (relative pressure) in the combustion chamber 10. The gas mixture thus charged in the combustion chamber 10 is then ignited by the ignition heater 24 for measuring the content of the hydrogen gas in the gas mixture for the purpose of judging the purity of the purified zinc sulphate solution.

The ratio between the hydrogen gas and the oxygen gas produced by the electrolysis of the electrolyte in the electrolytic cell 2 is generally about 1 : 99. In the present invention, the hydrogen gas is ignited in the combustion chamber 10 of predetermined volume in the state in which the combustion chamber 10 is fully closed. Therefore, the combustion of the hydrogen gas in the combustion chamber 10 of limited volume results in a decrease of the amount of the gas mixture as well as a reduction in the internal pressure. Suppose, for example, that the amount of the gas mixture is decreased by 1%, the temperature of the gas mixture is constant, and the initial pressure of the gas mixture is approximately equal to the atmospheric pressure. Then, the internal pressure of the combustion chamber 10 is reduced by about 100 mmH$_2$O. Thus, a very large variation occurs in the internal pressure of the combustion chamber 10 as a result of combustion of the hydrogen gas of very small amount, and this pressure variation can be detected by the pressure gauge 27.

According to the method of the present invention, checking with a medium such as a standard gas is unnecessary. Thus, the method of the present invention is advantageous among others in that the measurement can be carried out quite easier than that with a process gas chromatograph utilized commonly for automatic measurement. Further, the combustion of the hydrogen gas does not provide any appreciable rise in the gas temperature due to the fact that the heater 24 used for igniting the hydrogen gas has a very low calorific value and does not generate any appreciable heat since it is energized for a very short period of time and that the heat generated by the combustion of the hydrogen gas is also very little since the amount of the hydrogen gas is very small. Although the temperature of the gases in the combustion chamber 10 is increased slightly due to the combustion of the hydrogen gas by the heater 24, such temperature is reduced to be substantially equal to the atmospheric temperature in a short time after the deenergization of the heater 24 by virtue of the stirring effect of the stirrer 25 which acts to discharge the heat to the atmosphere through the walls of the combustion chamber 10. Furthermore, the actual gas pressure in the combustion chamber 10 can be accurately measured due to the fact that the internal pressure of the combustion chamber 10 after the combustion of the hydrogen gas is measured in a predetermined period of time after the deenergization of the heater 24.

According to the present invention, the hydrogen gas in the gas mixture introduced into the combustion chamber 10 is entirely subject to complete combustion to be completely turned into water drops which have not any effect on the internal pressure of the combustion chamber 10. Therefore, the internal pressure of the combustion chamber 10 before and after the combustion of the hydrogen gas can be accurately and quickly detected, and the amount of the hydrogen gas generated as a result of the electrolysis of the electrolyte in the electrolytic cell 2 can be easily detected on the basis of the pressure reduction corresponding to the content of hydrogen. The hydrogen gas content detected in the manner above described may then be applied to a converting table or a formula converting or showing the relation between the purity of the electrolyte and the hydrogen content in % previously calculated. Thus, the purity of the electrolyte can be easily determined.

After the measurement of the hydrogen gas content in the gas mixture, the zinc deposited on the cathode is removed by supplying current across the electrodes in a direction opposite to that in the electrolysis, and the end point is easily detected by the increase in the voltage. Thus, the zinc deposited on the cathode can be easily and automatically removed by the current supplied in the opposite direction.

The following TABLE shows a relationship between the current efficiency during the electrolysis of the purified acid aqueous solution and content of hydrogen gas in a gas mixture introduced into the combustion chamber, and shows pressure variation in the combustion chamber before and after the combustion of the hydrogen gas corresponding to the corresponding content of hydrogen gas.

TABLE

| pressure variation mmH$_2$O | 218 | 450 | 598 | 800 |
|---|---|---|---|---|
| content of hydrogen gas % | 1.4 | 2.9 | 3.85 | 5.2 |
| current efficiency % | 92.5 | 91.5 | 90.5 | 89.0 |

What we claim is:

1. A method of ascertaining the purity of a purified zinc sulphate solution used for the electrolytic production of zinc comprising the steps of sampling a part of said purified zinc sulphate solution and subjecting the same to electrolysis to generate a mixture of hydrogen gas and oxygen gas, feeding said gas mixture into a combustion chamber, igniting said hydrogen gas in said gas mixture by an ignition heater disposed within said combustion chamber while said combustion chamber is fully closed, and measuring the internal pressure of said combustion chamber before and after the combustion of said hydrogen gas, thereby measuring the content of said hydrogen gas in said gas mixture so as to ascertain the purity of said zinc sulphate solution on the basis of the hydrogen gas content thus measured.

* * * * *